(12) United States Patent
Magazzini

(10) Patent No.: US 11,499,361 B2
(45) Date of Patent: Nov. 15, 2022

(54) LIGHTWEIGHT LIFTER PLATE ASSEMBLY FOR VEHICLE WINDOW

(71) Applicant: MAGNA CLOSURES INC., Newmarket (CA)

(72) Inventor: Mario Magazzini, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 205 days.

(21) Appl. No.: 16/779,417

(22) Filed: Jan. 31, 2020

(65) Prior Publication Data

US 2020/0248495 A1 Aug. 6, 2020

Related U.S. Application Data

(60) Provisional application No. 62/801,181, filed on Feb. 5, 2019.

(51) Int. Cl.
  *B60J 1/16* (2006.01)
  *E05F 15/689* (2015.01)
  *B60J 1/17* (2006.01)

(52) U.S. Cl.
  CPC ............ *E05F 15/689* (2015.01); *B60J 1/17* (2013.01); *E05Y 2201/64* (2013.01); *E05Y 2600/314* (2013.01); *E05Y 2600/502* (2013.01); *E05Y 2900/55* (2013.01)

(58) Field of Classification Search
  CPC . E05F 15/689; E05F 2011/387; E05F 11/488; B60J 1/17; B60J 5/0416; B60J 5/0418; E05Y 2600/502; E05Y 2600/314; E05Y 2201/64; E05Y 2900/55

USPC ................................. 49/502, 352, 374, 375
See application file for complete search history.

(56) References Cited

U.S. PATENT DOCUMENTS

| | | | |
|---|---|---|---|
| 4,848,032 A * | 7/1989 | Bailor | B60J 1/17 49/350 |
| 4,866,895 A | 9/1989 | Hlavaty | |
| 4,937,977 A * | 7/1990 | Gergoe | B60J 1/17 49/352 |
| 5,546,704 A | 8/1996 | Maruoka | |
| 5,729,930 A | 3/1998 | Schust et al. | |

(Continued)

FOREIGN PATENT DOCUMENTS

| | | |
|---|---|---|
| CN | 1172032 A | 2/1998 |
| EP | 0708220 A1 | 4/1996 |

(Continued)

*Primary Examiner* — Jerry E Redman
(74) *Attorney, Agent, or Firm* — Dickinson Wright PLLC

(57) ABSTRACT

A lifter plate assembly for a window of a motor vehicle has a plastic main body. The main body includes a pair of rail guide hooks formed therein. The rail guide hooks are laterally spaced from one another and configured for sliding receipt of window regulator rails therein. A window clamp plate formed of the main body plastic extends in spaced relation from the main body to provide a receptacle configured for receipt of an edge of the window. A fastener assembly includes an elongate threaded member and a nut. The elongate threaded member extends through an opening in the main body and through an opening in the window clamp plate. At least one of the elongate threaded member and the nut is rotatable relative to the other to draw the window clamp plate and the main body toward one another to clamp against the edge of the window.

16 Claims, 11 Drawing Sheets

(56) References Cited

U.S. PATENT DOCUMENTS

| | | | |
|---|---|---|---|
| 5,778,599 A | 7/1998 | Saito | |
| 5,966,872 A * | 10/1999 | Wasek | E05F 11/385 49/348 |
| 6,152,636 A | 11/2000 | Nass | |
| 6,460,296 B1 | 10/2002 | Arquevaux | |
| 6,598,345 B1 * | 7/2003 | Arimoto | E05F 11/385 49/352 |
| 6,854,213 B2 * | 2/2005 | Galliani | B60J 1/17 49/375 |
| 6,862,846 B1 * | 3/2005 | Kirejczyk | B60J 5/0416 296/146.7 |
| 7,596,908 B2 * | 10/2009 | Rothe | E05F 11/385 49/349 |
| 7,610,720 B2 | 11/2009 | Kirejczyk et al. | |
| 7,743,555 B2 | 6/2010 | Smith | |
| 8,096,080 B2 * | 1/2012 | Pavlovic | E05F 11/382 49/348 |
| 8,146,293 B2 * | 4/2012 | Brownlie, Jr. | E05F 11/385 49/375 |
| 8,381,446 B2 * | 2/2013 | Trevarrow | E05F 11/385 49/375 |
| 8,453,383 B2 * | 6/2013 | Barr | E05F 11/385 49/374 |
| 8,966,820 B2 | 3/2015 | Broadhead et al. | |
| 10,753,137 B2 * | 8/2020 | Muramatsu | E05F 11/488 |
| 2002/0066232 A1 * | 6/2002 | Tatsumi | B60J 5/0416 49/502 |
| 2002/0139052 A1 * | 10/2002 | Messiez | E05F 11/483 49/375 |
| 2003/0066244 A1 * | 4/2003 | Staser | E05F 11/488 49/375 |
| 2005/0016071 A1 * | 1/2005 | Takeda | B60J 5/0416 49/352 |
| 2007/0000178 A1 * | 1/2007 | Wild | E05F 11/382 49/352 |
| 2007/0199246 A1 * | 8/2007 | Renke | E05F 11/488 49/352 |
| 2008/0005971 A1 | 1/2008 | Dickie et al. | |
| 2008/0289259 A1 * | 11/2008 | Costigan | B60J 5/0413 49/502 |
| 2009/0007494 A1 | 1/2009 | Pavlovic et al. | |
| 2009/0193718 A1 | 8/2009 | Tudora et al. | |
| 2009/0223133 A1 | 9/2009 | Miu et al. | |
| 2010/0043297 A1 * | 2/2010 | Barr | E05F 11/385 49/375 |
| 2011/0067311 A1 * | 3/2011 | Corden | E05F 11/382 49/70 |
| 2013/0097932 A1 | 4/2013 | Kriese et al. | |
| 2013/0255411 A1 | 10/2013 | McCorkell et al. | |
| 2015/0096237 A1 | 4/2015 | Pavlovic et al. | |
| 2017/0089115 A1 | 3/2017 | Wang et al. | |
| 2017/0292312 A1 * | 10/2017 | Yokoyama | E05F 7/04 |
| 2019/0040668 A1 * | 2/2019 | Muramatsu | E05F 11/483 |
| 2019/0078366 A1 * | 3/2019 | Lu | E05F 11/385 |
| 2019/0226261 A1 * | 7/2019 | Taubmann | E05F 15/689 |
| 2020/0131834 A1 * | 4/2020 | Yamamoto | B60J 1/17 |
| 2020/0149336 A1 * | 5/2020 | Pavlovic | E05F 11/483 |
| 2020/0173212 A1 * | 6/2020 | Pavlovic | E05F 11/483 |
| 2020/0248495 A1 * | 8/2020 | Magazzini | B60J 1/17 |
| 2020/0386026 A1 * | 12/2020 | Reames | E05F 11/385 |
| 2020/0386027 A1 * | 12/2020 | Mueller | E05F 11/385 |

FOREIGN PATENT DOCUMENTS

| | | |
|---|---|---|
| GB | 2468405 A | 8/2010 |
| WO | 2007140605 A1 | 12/2007 |
| WO | 2018114904 A1 | 6/2018 |

* cited by examiner

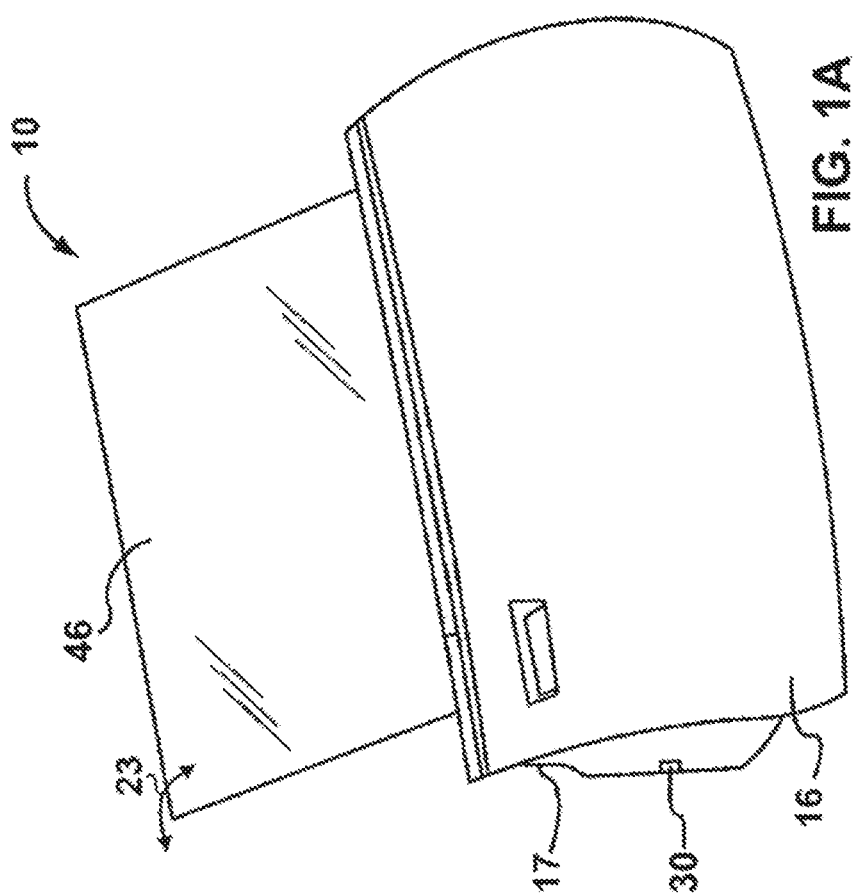

LIGHTWEIGHT LIFTER PLATE ASSEMBLY FOR VEHICLE WINDOW

CROSS-REFERENCE TO RELATED APPLICATION

This application claims the benefit of U.S. Provisional Application Ser. No. 62/801,181, filed Feb. 5, 2019, which is incorporated herein by way of reference in its entirety.

FIELD

The present disclosure relates generally to vehicle window assemblies, and more particularly to vehicle window assemblies and adjustable window regulator lifter plates therefor.

BACKGROUND

This section provides background information related to the present disclosure which is not necessarily prior art.

In many motor vehicle door assemblies, an outer sheet metal door panel and an inner sheet metal door panel are connected together to define an internal door cavity therebetween. An equipment module or sub-assembly, commonly referred to as a carrier module, or simply carrier, is often mounted to the inner door panel within the internal door cavity. The carrier typically functions to support various door hardware components, including window regulator rails configured to support lifter plates for selectively slidable movement therealong, as well as a window regulator motor, often simply referred to as window regulator, to drive the lifter plates along the window regulator rails. The lifter plates are fixed to a window to cause the window to slide up and down therewith along the direction of guide channels within the window regulator rails in response to powered actuation of the window regulator.

In certain types of vehicles, such as convertibles, the vehicle door is frameless, which means that the vehicle door does not possess an upper portion with a guide track for the window. This can prove problematic because without a guide track, stability of the window is provided solely by the lifter plates, and thus, the lifter plates are typically made from bulky metal components, such as via solid metal components or via metal insert components. As such, the lifter plates are generally heavy and costly in manufacture.

In view of the above, there is a need to provide lifter plates for a frameless door that are high strength, robust, stiff and durable, while at the same time being lightweight and economical in manufacture and assembly.

SUMMARY

This section provides a general summary of the disclosure and is not intended to be a comprehensive listing of all features, advantages, aspects and objectives associated with the inventive concepts described and illustrated in the detailed description provided herein.

It is an object of the present disclosure to provide lifter plates that address at least some of those issues discussed above with known lifter plates.

In accordance with the above object, it is an aspect of the present disclosure to provide lifter plates that are high strength, robust, stiff and durable, while at the same time being lightweight and economical in manufacture and assembly.

In accordance with one aspect of the disclosure, the present disclosure is directed to lifter plates for a window of a motor vehicle door assembly.

In accordance with one aspect of the disclosure, the present disclosure is directed to lifter plates for a window of a frameless motor vehicle door assembly.

In accordance with another aspect of the disclosure, a lifter plate assembly for a window of a motor vehicle has a plastic main body. The main body includes a pair of rail guide hooks formed therein. The rail guide hooks are laterally spaced from one another and configured for sliding receipt of window regulator rails therein. A window clamp plate formed of the main body plastic extends in spaced relation from the main body to provide a receptacle configured for receipt of an edge of the window. A fastener assembly includes an elongate threaded member and a nut. The elongate threaded member extends through an opening in the main body and through an opening in the window clamp plate. At least one of the elongate threaded member and the nut is rotatable relative to the other to draw the window clamp plate and the main body toward one another to clamp against the edge of the window.

In accordance with another aspect of the disclosure, the main body includes a plurality of ribs bounding a plurality of voids.

In accordance with another aspect of the disclosure, at least one of the plurality of ribs extends between the pair of rail guide hooks in attached relation therewith to enhance the strength, stability and rigidity of the rail guide hooks.

In accordance with another aspect of the disclosure, at least one of the plurality of ribs forms an annulus about the opening in the main body to provide enhanced support and clamping force between the main body and the window clamp plate by enhancing the compressing crush strength of the main body.

In accordance with another aspect of the disclosure, a plurality of the ribs form spokes extending radially outwardly from the annulus.

In accordance with another aspect of the disclosure, the annulus can be provided having an increased thickness relative to the spokes to enhance the crush strength of the main body.

In accordance with another aspect of the disclosure, a cable connector body can be formed of a monolithic piece of the plastic material of the main body, with the cable connector body being configured for fixed receipt of drive cables therein.

In accordance with another aspect of the disclosure, a plurality of the ribs can be formed to extend between the main body and a wall of the cable connector body, thereby enhancing the strength, stability and rigidity of the cable connector body, while reducing the weight and cost of the lifter plate.

In accordance with another aspect of the disclosure, the nut can include a metal threaded insert configured for threaded engagement with the elongate threaded member and a plastic annulus bonded to the metal insert, wherein the plastic annulus can be formed to extend radially outwardly from the metal insert to facilitate rotating the nut into threaded engagement with the elongate threaded member.

In accordance with another aspect of the disclosure, a pair of lubricious inserts can be fixed within and line the rail guide hooks.

In accordance with another aspect of the disclosure, the lubricious inserts can be configured for a snap fit within the rail guide hooks to facilitate assembly and reduce cost associated with assembly.

In accordance with another aspect of the disclosure, a carrier assembly is provided. The carrier assembly includes a pair of carrier members. Each of the carrier members has a window regulator rail and a lifter plate assembly disposed for sliding movement along the window regulator rail. Each of the lifter plate assemblies has a main body formed of a plastic material. The main body has at least one rail guide hook formed therein configured for sliding receipt of a separate one of said window regulator rails. A window clamp plate is formed as a monolithic piece of the plastic material of the main body. The window clamp plate extends in spaced relation from the main body to provide a receptacle between the main body and the window clamp plate, with the receptacle being configured for receipt of an edge of the window therein. A fastener assembly, including an elongate threaded member, is provided. The elongate threaded member is arranged extending through an opening in the main body and through an opening in the window clamp plate for threaded engagement with a nut. The elongate threaded member and the nut are rotatable relative to one another to draw the window clamp plate and the main body toward one another to fixedly clamp against the edge of the window to prevent relative movement between the main body and the window.

In accordance with another aspect, there is provided a frameless door assembly having a carrier assembly having at least one window regulator rail; at least one lifter plate assembly each for attachment a window of a motor vehicle and the at least one rail, the at least one lifter plate assembly having a main body formed of a plastic material, said main body having at least one rail guide hook formed therein configured for sliding receipt of the window regulator rail therein, a window clamp plate formed as a monolithic piece of the plastic material of the main body and extending in spaced relation from the main body to provide a receptacle between the main body and the window clamp plate, with the receptacle being configured for receipt of an edge of the window therein, and a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 1A illustrates the door assembly of FIG. 1 configured as frameless door assembly, in accordance with an illustrative embodiment;

DETAILED DESCRIPTION OF PRESENTLY PREFERRED EMBODIMENTS

Figure 1:
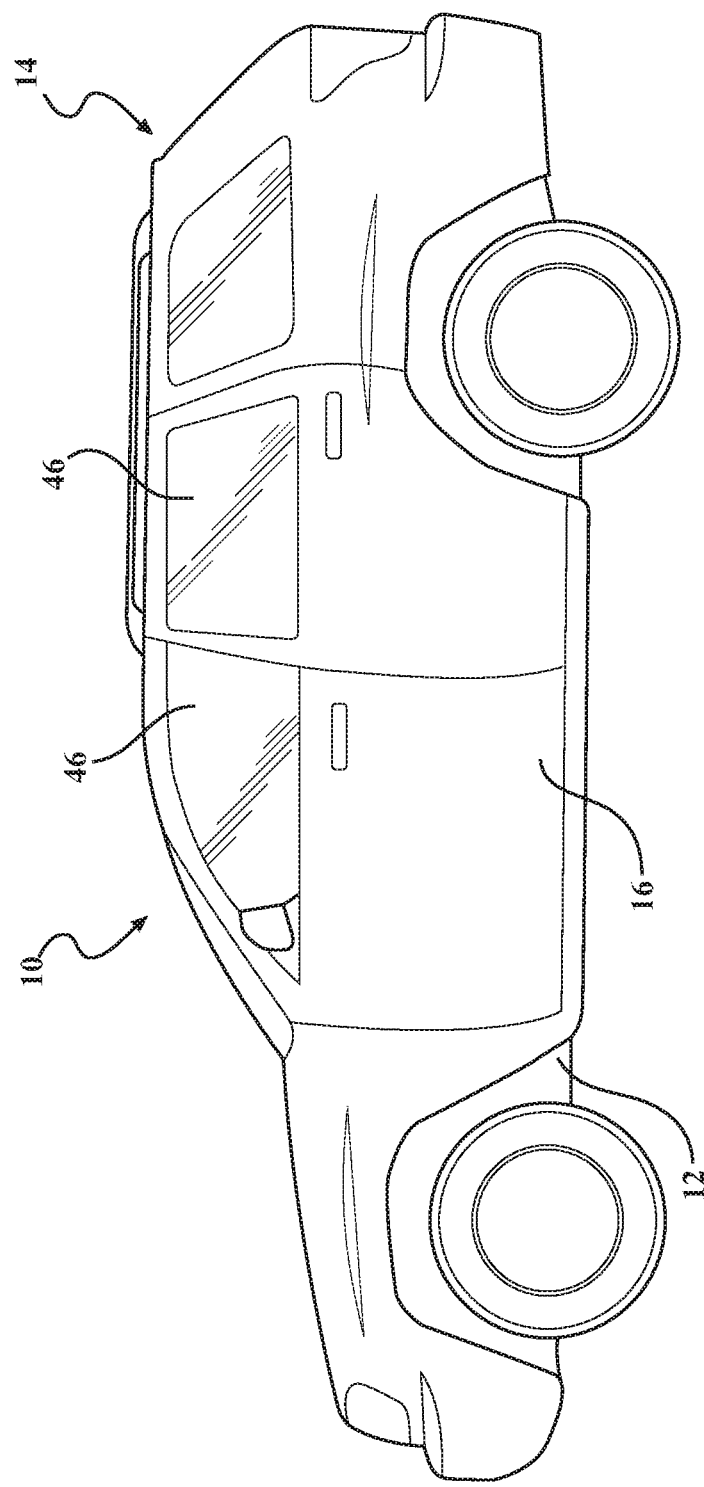
FIG. 1 illustrates a motor vehicle with a door assembly having lifter plates for a window in accordance with an aspect of the disclosure.

An example embodiment of a motor vehicle closure panel and lifter plates therefor will now be described more fully with reference to the accompanying drawings. To this end, the example embodiment of a lifter plate is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiment may be embodied in many different forms, and that the example embodiment should not be construed to limit the scope of the present disclosure. In some parts of the example embodiment, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 3:
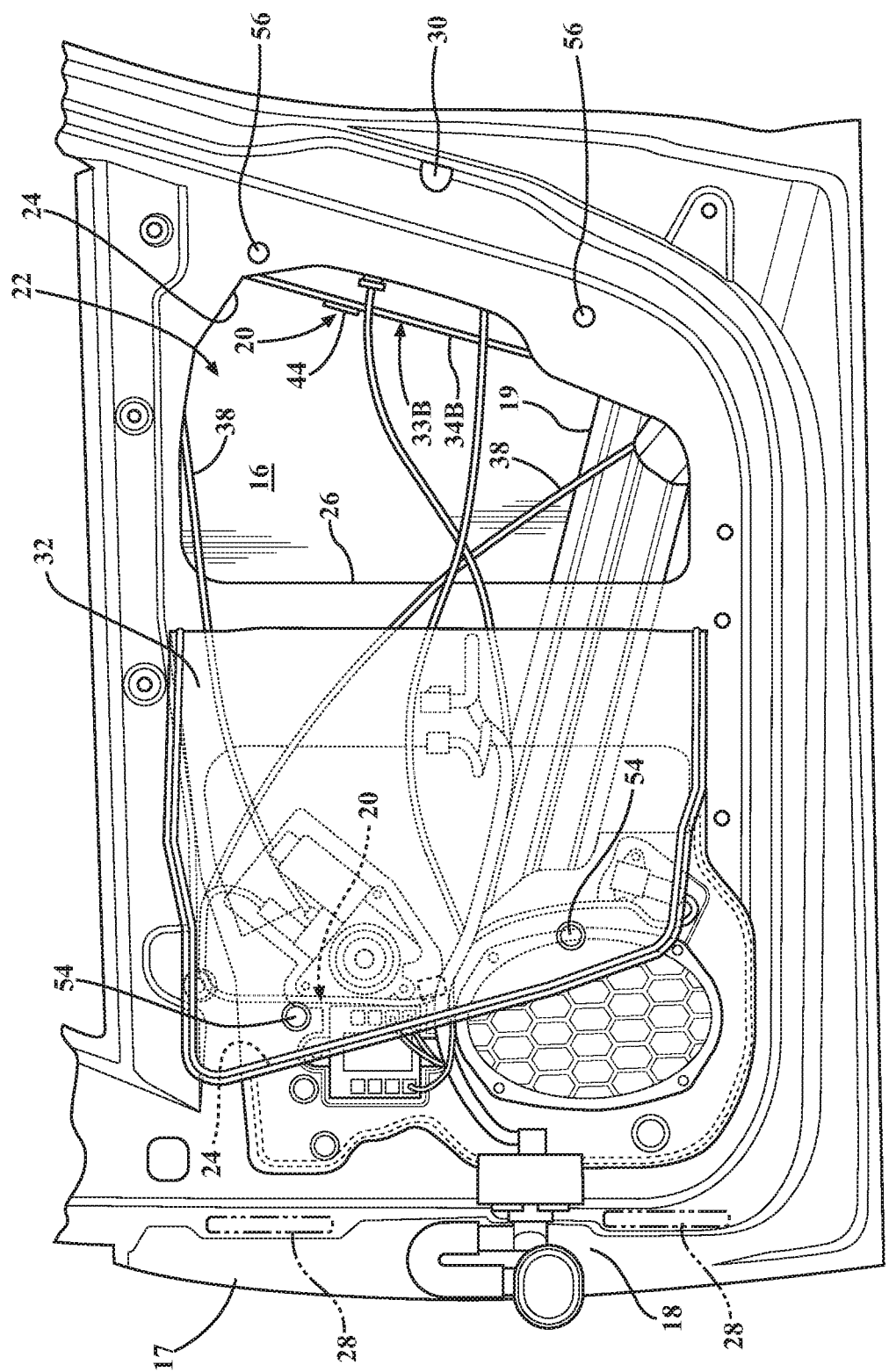
FIG. 3 illustrates the carrier module of FIG. 2 shown assembled to the door assembly of FIG. 1 with a barrier folded back.

Reference is made to FIG. 1, which shows a door assembly 10 mounted to a body 12 of a motor vehicle 14. The door assembly 10 includes an outer panel 16, an inner panel 18 (FIG. 3), an intrusion member 19 and a frameless door carrier module, referred to hereafter simply as carrier 20. Carrier 20 has a pair of carrier members 33A, 33B providing window regulator rails, including, respectively, an A-pillar rail (34A) and a B-pillar window regulator rail 34B, and a plurality of door hardware components operably mounted to the carrier members 33A, 33B. In this non-limiting example, at least some of the door hardware includes a power-operated window regulator 36 having an electric motor-driven cable 38 entrained about upper pulleys 40 of each carrier member 33A, 33B and lower pulleys 42 of each carrier member 33A, 33B. Other hardware components shown are well understood by those skilled in the art, and thus, need no explanation, in addition to other components that can be provided, but are not shown. A pair of lifter plate assemblies, referred to hereafter as lifter plates 44, constructed in accordance with one aspect of the disclosure are supported for sliding movement along the separate window regulator rails 34A, 34B for moving a window 46 upwardly and downwardly within a pair of glass run channels 48. The glass run channels 48 can be provided separately or formed integrally as a single piece of material with the A and B-pillar carrier members 33A, 33B, such as in a molding operation, by way of example and without limitation. The lifter plates 44, for reasons discussed further hereafter, are high strength, robust, stiff and durable, while at the same time being lightweight and economical in manufacture and assembly.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 17 that forms an internal door cavity 22 (FIG. 3) that contains various components of the door assembly 10, including at least a portion of the carrier 20. To facilitate assembly of the components into the cavity 22, the inner panel 18 has at least one, and shown as a pair of openings 24, by way of example and without limitation. The openings 24 are shown as being formed on opposite sides of the inner panel 18 with a central support member or rail 26 extending therebetween. The central support rail 26 can be formed as an integral, monolithic piece of material with the inner panel 18, thereby rendering the inner panel 18 economical in manufacture and enhancing the structural integrity, strength and side impact resistance of the inner panel 18. Due to the ability of at least some of the carrier module components, discussed separately hereafter, to be moved relative to one another, and due to the relatively small size of the individual components of the carrier 20, in comparison to the size of the assembled carrier 20, as discussed in more detail below, and further due to the ability to maintain at least a portion of the carrier 20 externally from the internal door cavity 22, the size of the individual openings 24 needed in the inner panel 18 for assembly of the carrier 20 can be minimized. As such, the amount and area of material forming the inner panel 18 can be maximized, thereby increasing the side impact strength of the inner panel 18 relative to inner panels having substantially larger central openings and reduced area.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of hinges 28 are connected to door panel structure 17 and pivotally mount a front end of door panel structure 17 (and door assembly 10) to the vehicle body 12. A door latch 30 is mounted to the rear end of door panel structure 17 to permit the releasable closure of door assembly 10 against vehicle body 12. Hinges 28 and door latch 30 act as force transfer members through which forces in door assembly 10 are transmitted to vehicle 14. Such forces include, for example, side-impact forces from another vehicle or object colliding with the vehicle 14.

Figure 2:
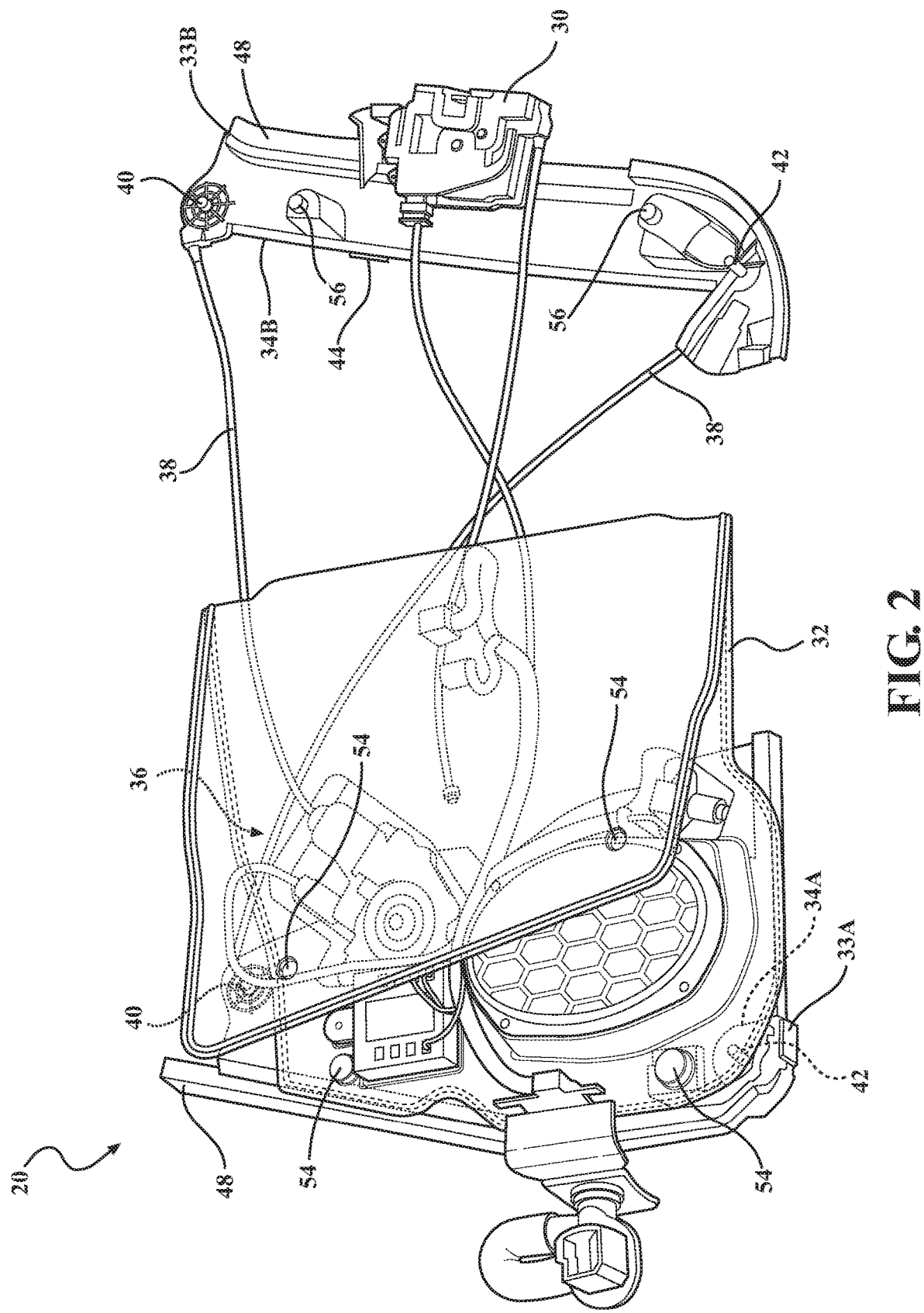
FIG. 2 illustrates a carrier module and lifter plates of the door assembly of FIG. 1 constructed in accordance with one aspect of the disclosure.
Figure 4:
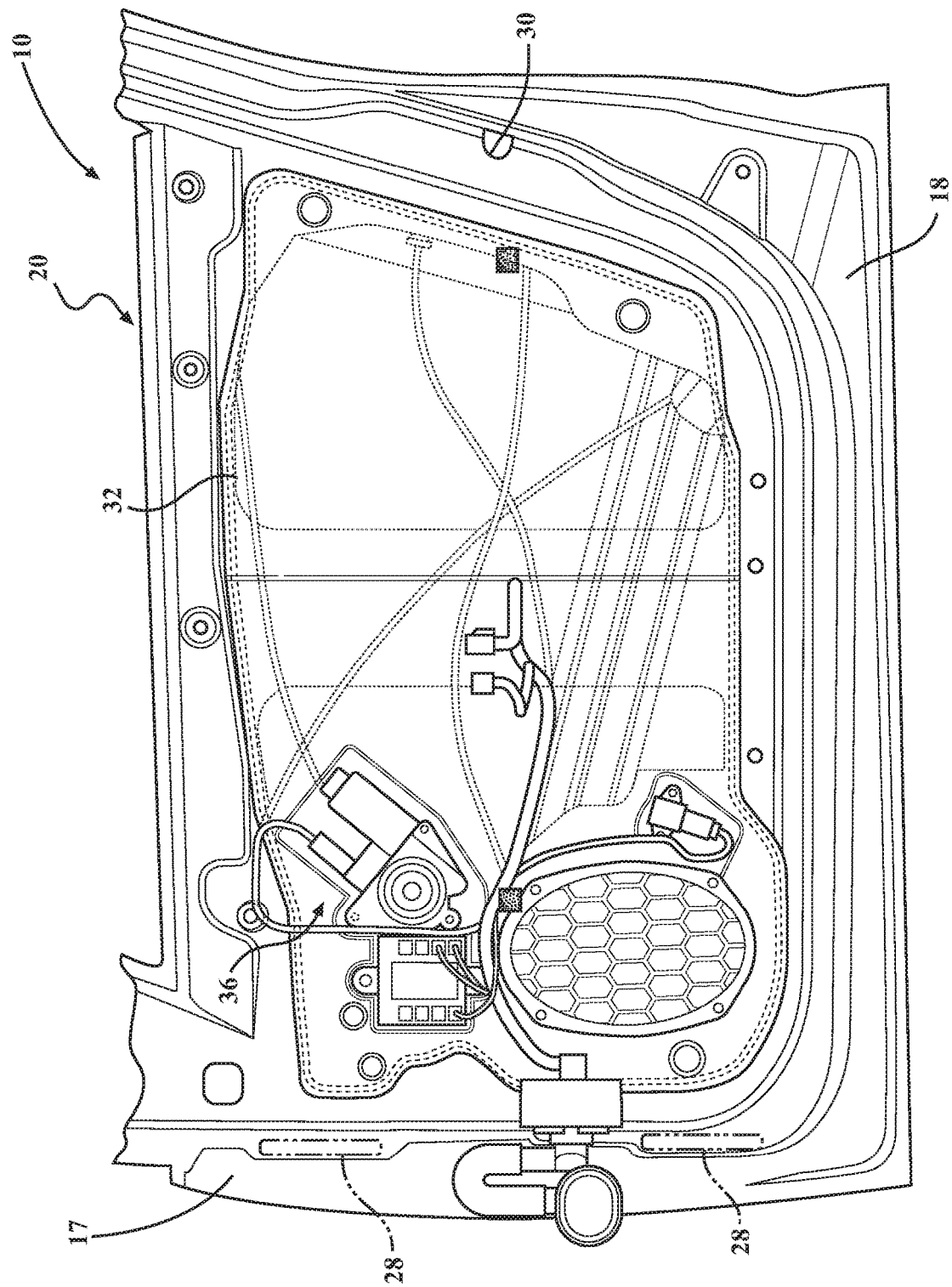
FIG. 4 illustrates the carrier module and barrier of FIG. 2 shown fully assembled to the door assembly of FIG. 1.

The carrier 20 is shown having a barrier member, shown as being a collapsible barrier member 32, by way of example and without limitation, attachable to the A and B-pillar carrier members 33A, 33B of carrier 20, though their orientation could be reversed, if desired. The barrier member 32, intended to function both as a fluid (water) barrier and as a sound barrier, can be formed of any suitable fluid/sound barrier material, as desired, in order to meet the necessary specifications. Further, in order to facilitate assembly, including ensuring the barrier member 32 is properly located and fixed in sealed relation relative to the inner panel 18, the barrier member 32 can be formed with locating features 54, shown by way of example as female recesses, configured for mating engagement with corresponding locating features 56, shown by way of example as male protrusions (FIGS. 2-4), on at least one of the separate carrier members 33A, 33B. The locating features 54, 56 can be formed to provide a snug, interference fit with one another.

In accordance with a further non-limiting embodiment, A-pillar carrier member 33A and B-pillar carrier member 33B can be constructed entirely of plastic, thereby being relatively lightweight as compared to a similar structure made of metal, e.g. steel, and also being economical in manufacture, such as via a molding process, by way of example and without limitation, as well as being rigid and durable.

With reference additionally to FIG. 1A, door assembly 10 is shown configured as a frameless door assembly, whereby the window 46 is not bounded by a frame extending from the door panel structure, for example from outer panel 16 and/or an inner panel 18 such that when the window 46 is in the closed position e.g. in an extended position as seen in FIG. 1A, the window 46 may be sealed against the against vehicle body 12 when the door assembly 10 is latched against vehicle body 12 or shut. When the window 46 is in the closed position, that is extending fully upwards as shown in FIG. 1A, and the door assembly 10 is released from against vehicle body 12 or open, the window 46 would not be bounded by a supporting frame e.g. vehicle body 12, such that an illustrative bending force 23 applied to the window 46 may result in lateral or side to side stress on the window regulator components as will now be described in more exemplary detail different than stresses e.g. upwards and downwards experienced during opening and closing of the window 46 as would otherwise be absorbed by door assembly 10 having a frame extending from the door panel structure to surround the window 46. Another example of a frameless door assembly is illustrated in commonly owned U.S. patent application No. 20190078366, entitled "Light weight two piece frameless door module with adjustment features", the entire contents of which are incorporated herein by reference.

In accordance with an aspect of the disclosure, the lifter plates 44 have a main body 50 formed entirely of plastic material, such as in an injection molding process, by way of example and without limitation. Within the main body 50, a plurality of relatively thin walls, also referred to as ribs 58 (only a few identified for simplicity), and a plurality of cavities, also referred to as voids 60 (only a few identified for simplicity), are formed, with the ribs 58 providing the strength, rigidity and durability aspects to the lifter plates 44, and the voids 60 providing the lightweight aspect, along with reducing overall cost of material and enhancing economies of manufacture in the molding process. The plurality of voids 60 are bounded by the ribs 58 of the plastic material, wherein the ribs 58 can be shaped and configured as desired, and are shown configured in a patterned wall configuration to both reduce the weight, while at the same time, enhance the strength and rigidity of the lifter plate 44. The ribs 58 can be sized having a desired length, height and width, and can be arranged as desired to provide optimal strength and rigidity for the intended application, wherein the pattern depicted, by way of example and without limitation, has a plurality of arcuate ribs 58 spaced in generally concentric relation with one another with additional ribs 58 extending radially between and generally transversely to the arcuate ribs 58. Accordingly, it is contemplated herein that other than configuring the ribs 58 as shown, other moldable patterns could be used, such as an array of circular, non-circular, triangular, and rectangular walls, or any other geometric configuration of walls desired.

The main body 50 has an inner side 62 facing toward the cavity 22 and an outer side 64 facing away from the cavity 22 of the door panel structure 17. The main body 50 includes a pair of rail guide hooks 66 formed therein, wherein the rail guide hooks 66 can be formed having any suitable shape configured for sliding receipt of window regulator rails 34A, 34B therein, such as to form a generally L-shaped slot 68, or otherwise, with the slots 68 being shaped to retain the window regulator rails 34A, 34B therein. The rail guide hooks 66 are laterally spaced from one another and are shown as having at least one rib 58 extending therebetween in directed molded attachment therewith to provide enhanced strength, rigidity and stability to the rail guide hooks 66. As such, although the rail guide hooks 66 are formed of lightweight plastic, they are substantially rigid to facilitate smooth sliding along the window regulator rails 34A, 34B. To further facilitate smooth sliding along the window regulator rails 34A, 34B, lubricious inserts 70, such as bushing grade polymeric or metallic material, can be disposed to line the inner surface of the rail guide hooks 66, and to extend therebetween, if desired, such as via being snap fit, insert molded, or otherwise bonded therein.

The lifter plate 44 further includes window clamp plate 72 formed as a monolithic piece of the plastic material of the main body 50. The window clamp plate 72 is shown as extending outwardly from the main body 50 along an arcuate strap portion 73 from adjacent a bottom surface 74 of the main body 50 and then extends upwardly toward a top surface 76 of the main body 50 to an enlarged clamp portion, shown as being generally disc shaped, to a free edge 78. The window clamp plate 72 extends in spaced relation from the main body 50 to provide a receptacle 80 configured for sliding receipt of an edge of the window 46 therein, wherein the edge of the window 46 can rest against the arcuate portion 73 if desired, though the window 46 can be supported above the arcuate portion 73 via clamping force provided by a fastener assembly 82, as discussed hereafter.

Figure 5:
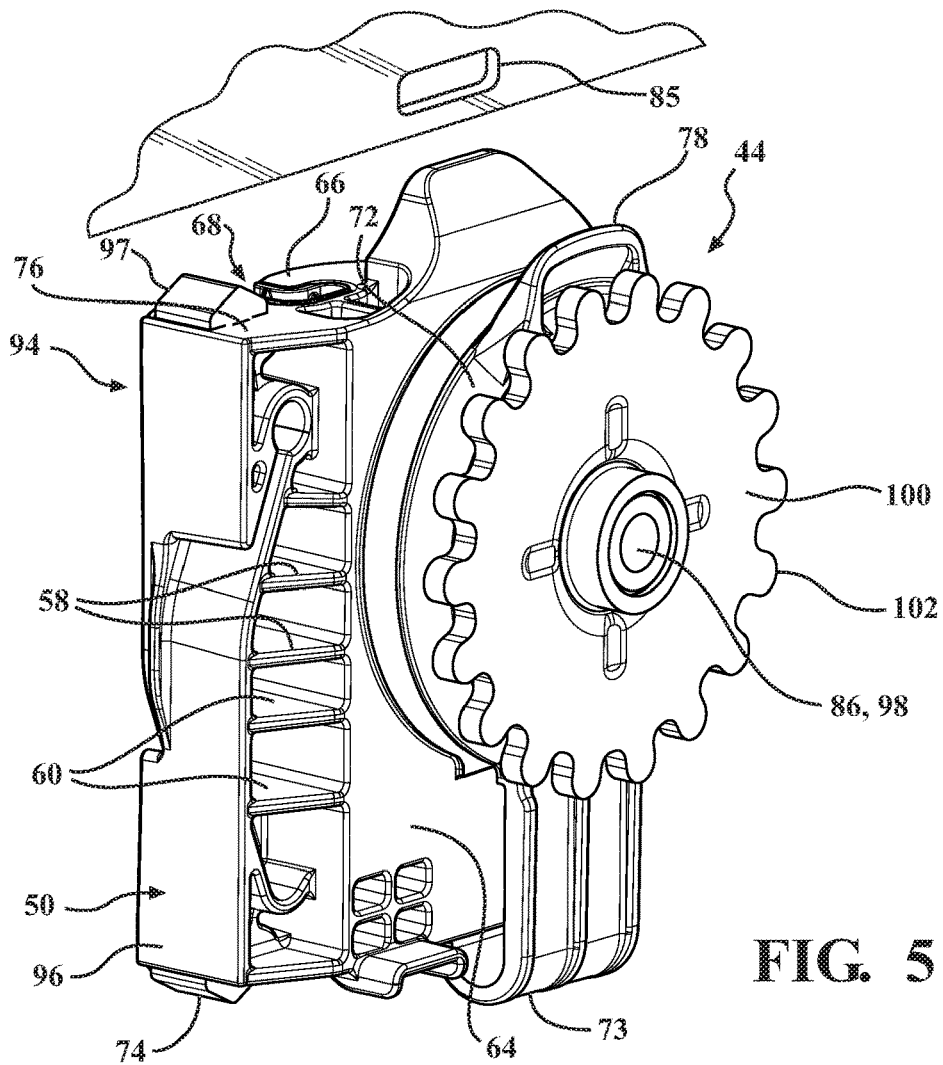
FIG. 5 illustrates a front side perspective view of a lifter plate in accordance with one aspect of the disclosure.
Figure 5A:
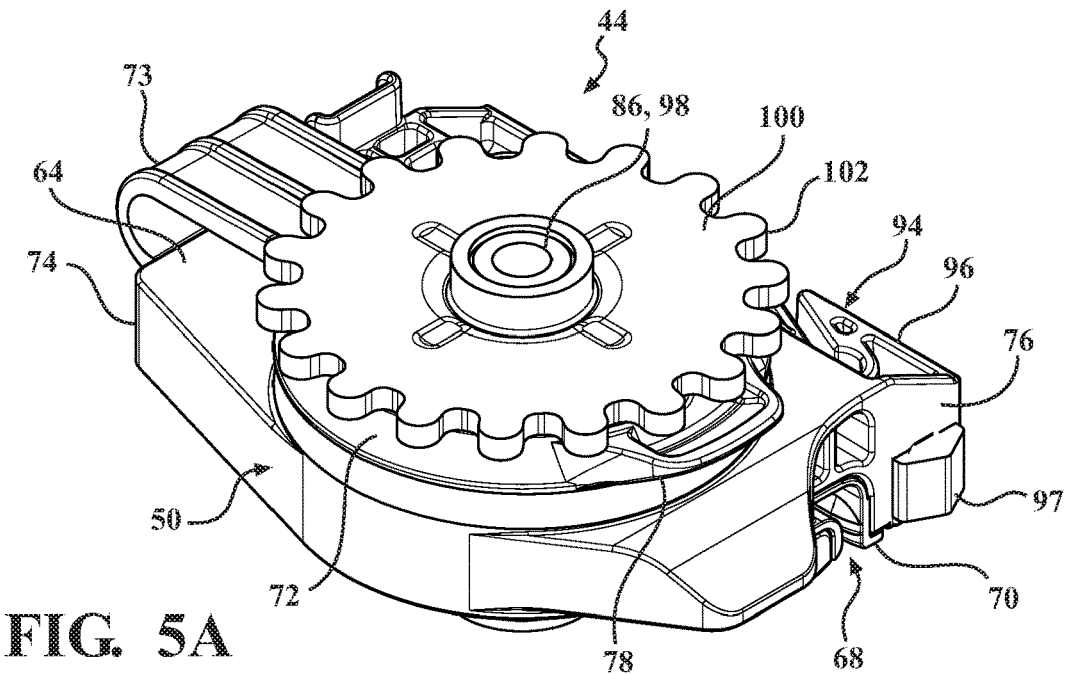
FIG. 5A illustrates another front side perspective view of the lifter plate of FIG. 5.
Figure 8:
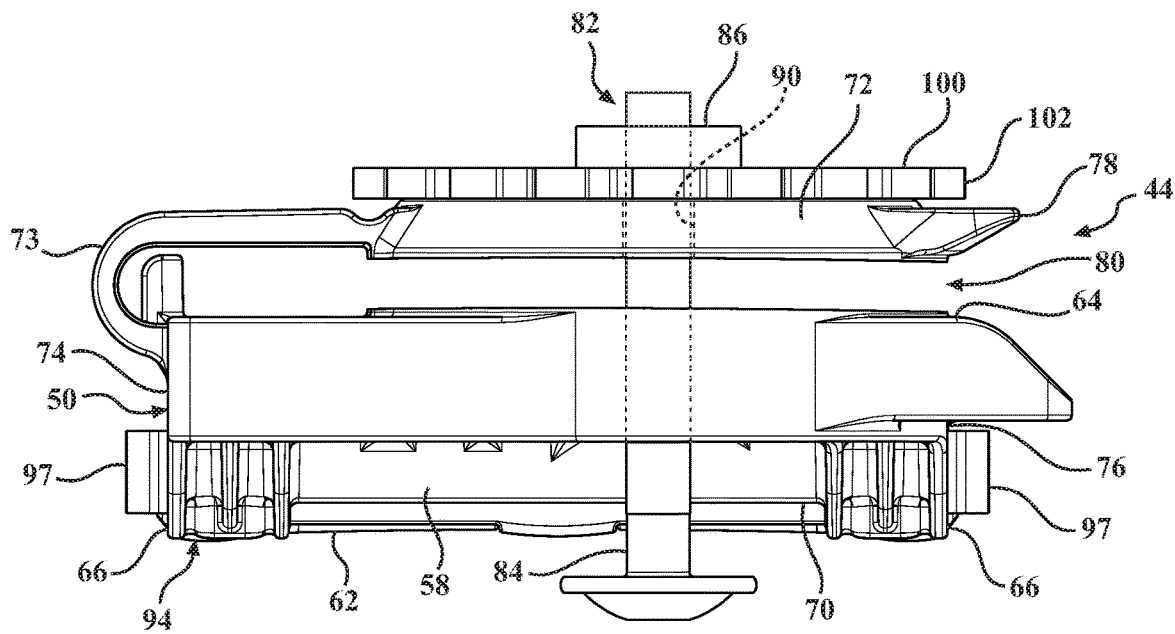
FIG. 8 illustrates a first side elevation view of the lifter plate of FIG. 5.
Figure 9:
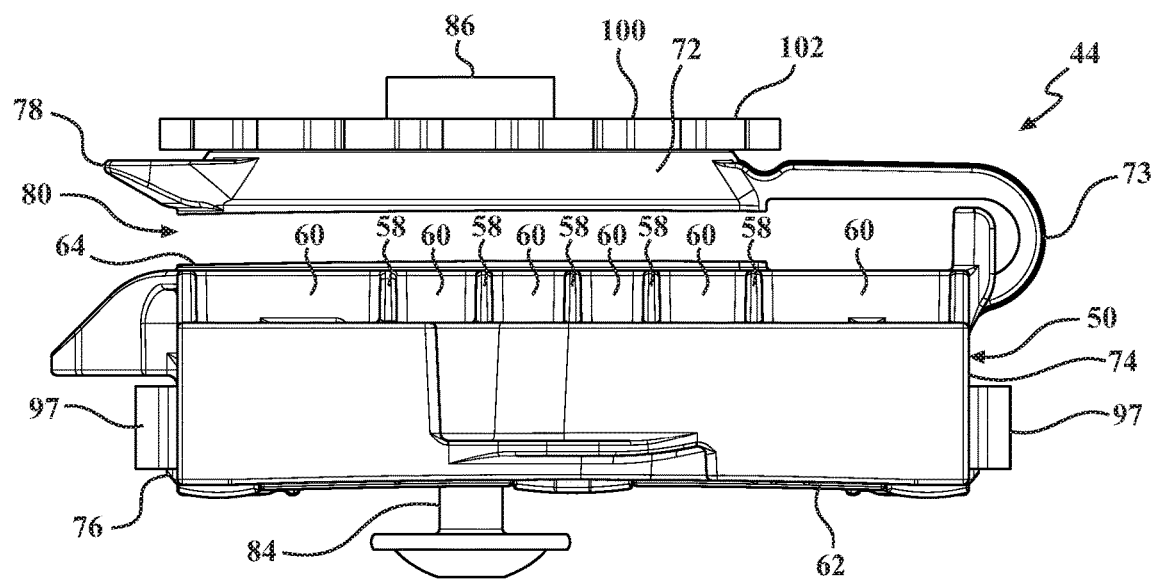
FIG. 9 illustrates a second side elevation view opposite the first side of FIG. 8 of the lifter plate of FIG. 5.
Figure 10:
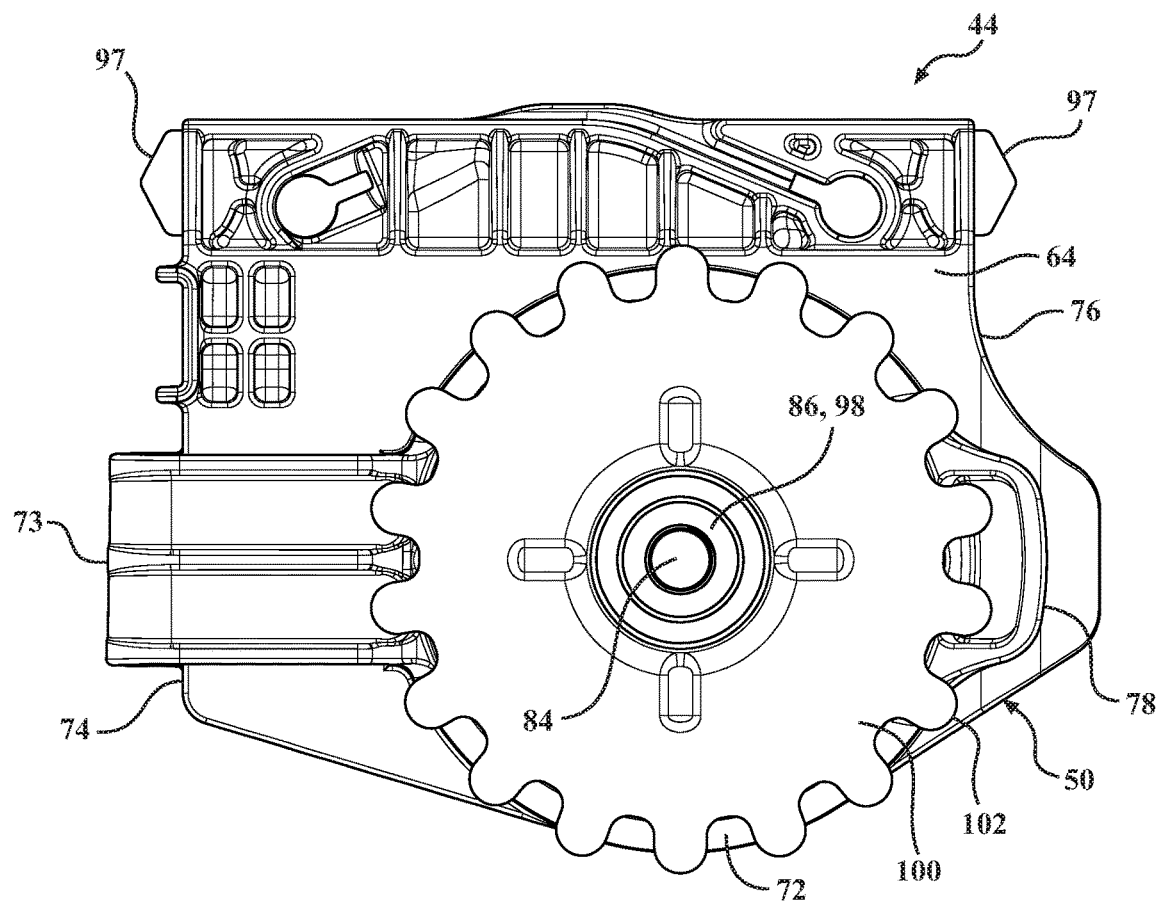
FIG. 10 illustrates a front elevation view of the lifter plate of FIG. 5.

The fastener assembly 82 includes an elongate male threaded member 84, sized for receipt through an opening 85 (FIG. 5) pre-formed in the window 46, such as a bolt and a female threaded member 86, such as a nut. The elongate threaded member 84 extends through an opening 88 in the main body 50 and through an opening 90 (FIG. 8) in the window clamp plate 72. At least one of the elongate threaded member 84 and the nut 86 is rotatable relative to the other to draw the window clamp plate 72 and the main body 50 toward one another to clamp against the edge of the window 46, wherein the clamping force is assured of maintaining the window 46 in the desired position, in part due to the reinforcing structure provided by the ribs 58.

At least one of the plurality of ribs 58 forms an annulus 92 about the opening 88 in the main body 50 in close proximity thereto to provide enhanced support and clamping force between the main body 50 and the window clamp plate 72 by enhancing the compressing crush strength of the main body 50. The fastener member 84 is shown as having an enlarged head 94 sized for abutment with the annulus 92, and with the annulus 92 having a suitable thickness (t) (FIG. 6A), the compressive crush strength across the annulus 92 is increased to withstand an increased compressive force imparted by the fastener member 84.

A plurality of the ribs 58 form spokes 58' extending radially outwardly from the annulus 92. The annulus 92 can be provided having a circular shape, by way of example and without limitation, and an increased thickness (t) relative to the spokes 58' and relative to the remaining ribs 58, if desired, to enhance the crush strength of the main body 50, thereby preventing damage thereto while fixing the window 46 within the window receptacle 80 via tightening the fastener assembly 82, while at the same time reducing the weight of the lifter plate 44 via the reduced thickness ribs 58, 58'.

Figure 6A:
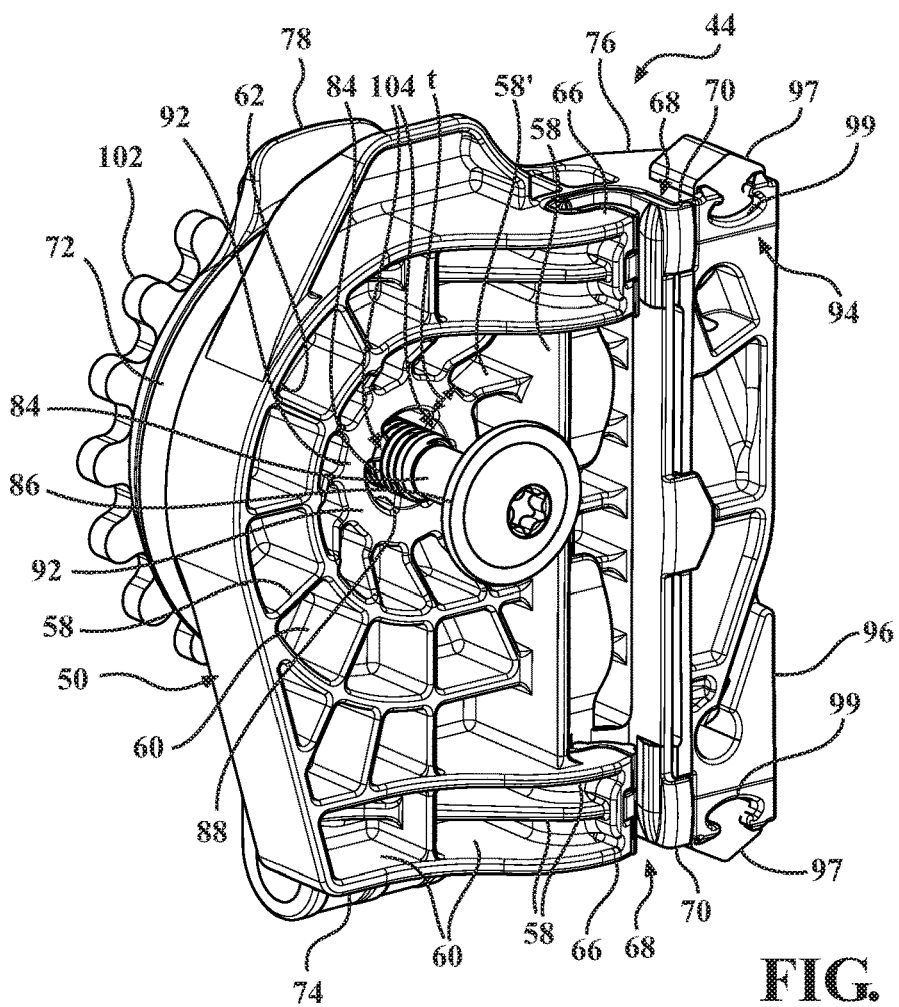
FIG. 6A illustrates another back side perspective view of the lifter plate of FIG. 5.
Figure 6:
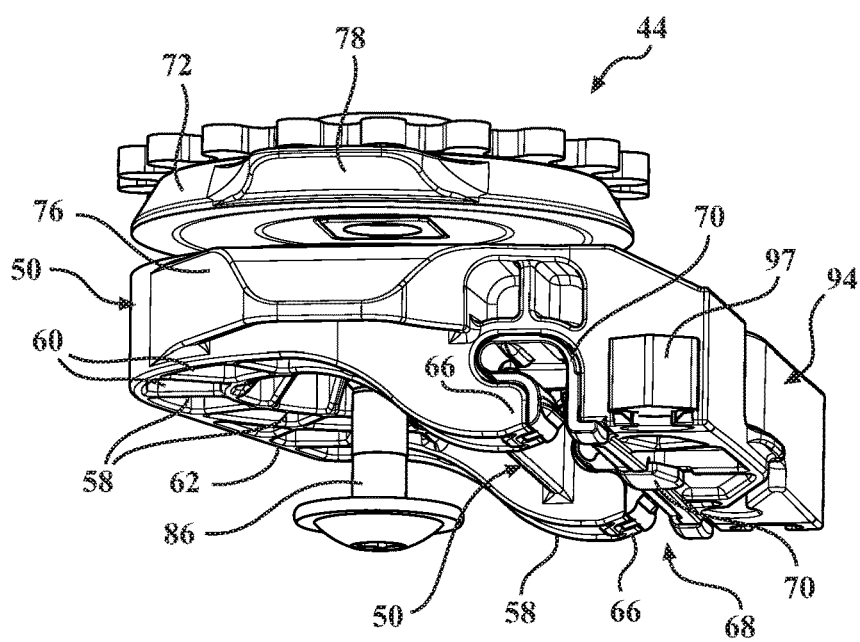
FIG. 6 illustrates a back side perspective view of the lifter plate of FIG. 5.
Figure 7:
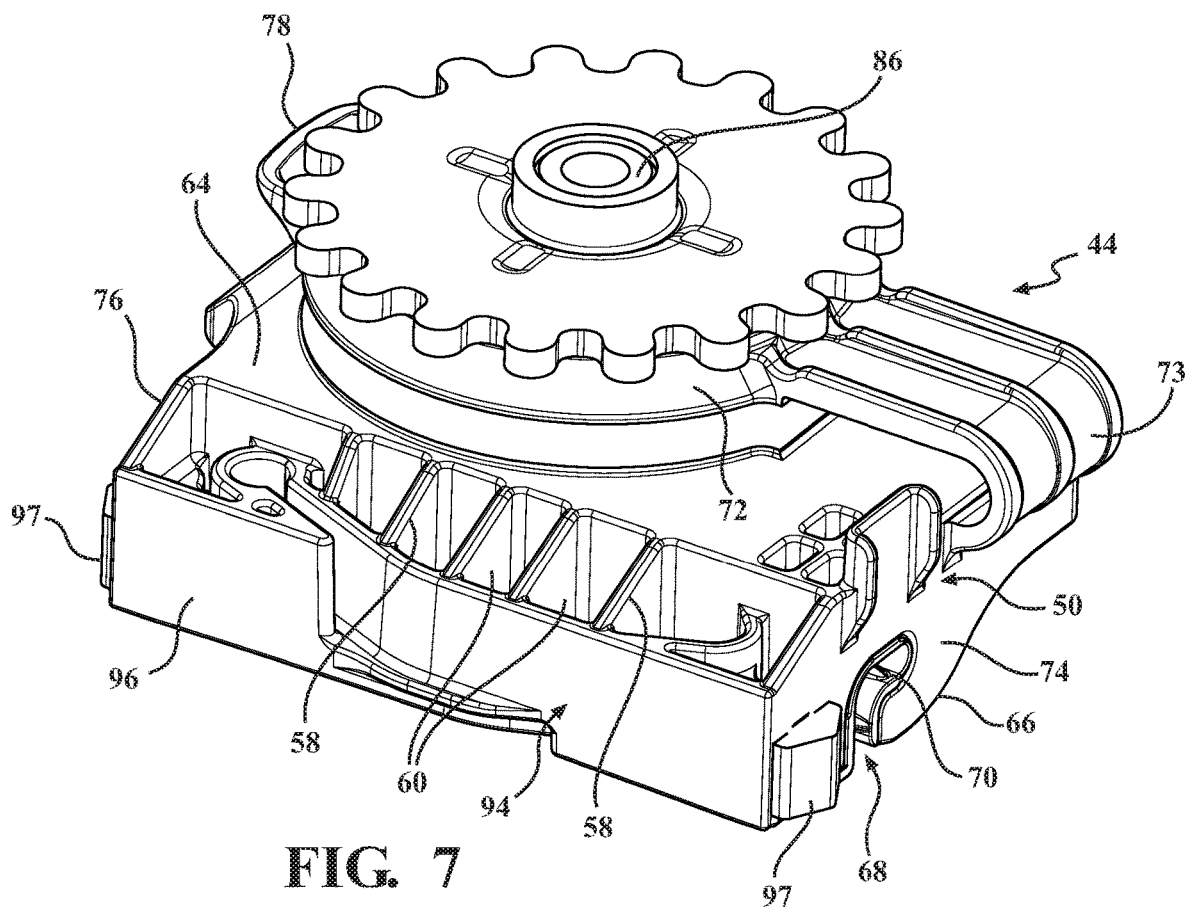
FIG. 7 illustrates another front side perspective view of the lifter plate of FIG. 5.
Figure 11:
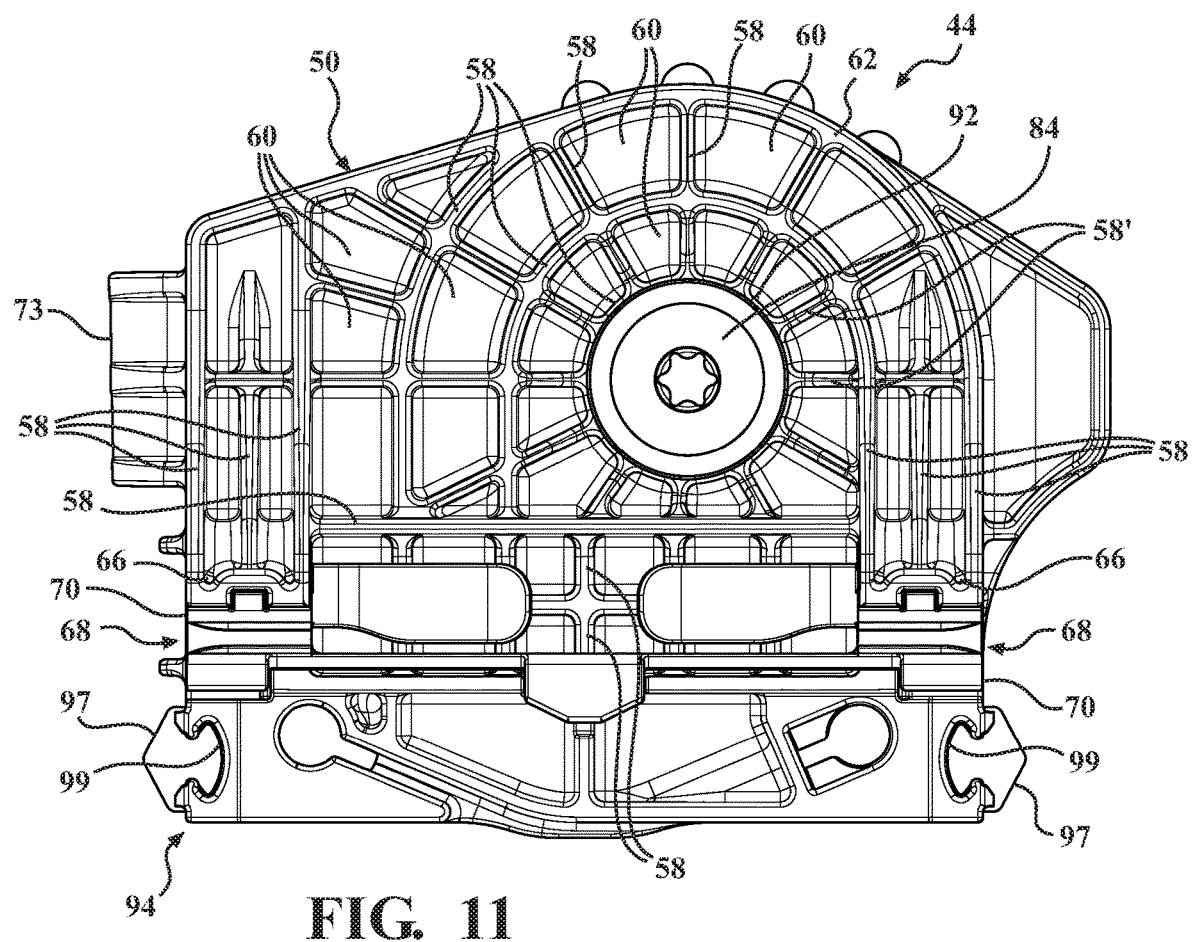
FIG. 11 illustrates a back elevation view of the lifter plate of FIG. 5.
Figure 12:
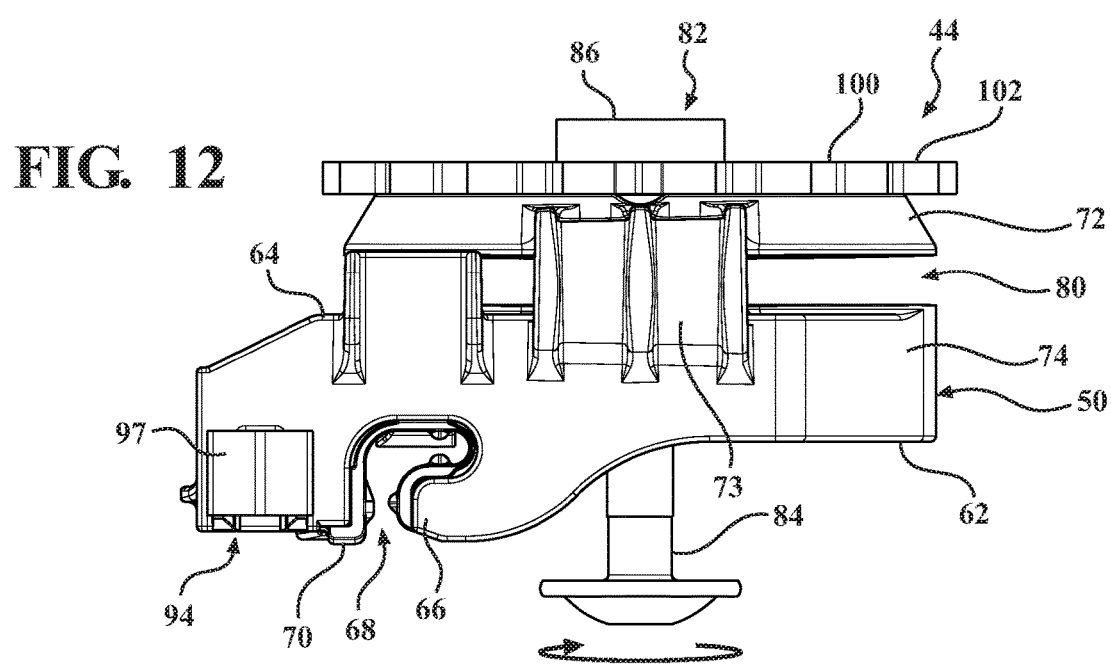
FIG. 12 illustrates a bottom view of the lifter plate of FIG. 5.
Figure 13:
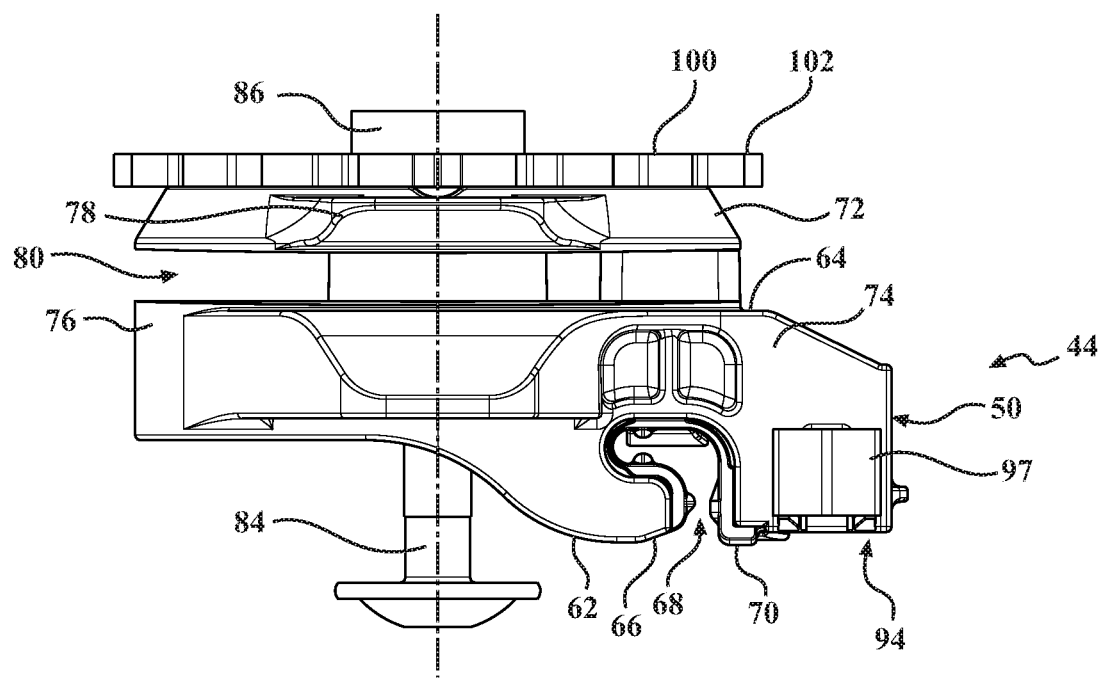
FIG. 13 illustrates a top view of the lifter plate of FIG. 5.

A cable connector body 94 can be formed of a monolithic piece of the plastic material of the main body 50. The cable connector body 94 is configured for fixed receipt of free ends of the drive cables 38 therein. A plurality of the ribs 58 can be formed to extend between the main body 50 and a wall 96 of the cable connector body, thereby enhancing the strength, stability and rigidity of the cable connector body 94, while reducing the weight and cost of the lifter plate 44. To facilitate noise reduction, resilient bumpers 97, such as rubber, can be fixed on opposite ends of the cable connector body 94. As best shown in FIGS. 6A and 11, the bumpers 97 can be snap fit or slid in an interference fit within channels 99 molded into the cable connector body 94, such as in a dovetail type fit, by way of example and without limitation. Accordingly, assembly is made easy and secondary fasteners or fixation mechanisms can be avoided, though an adhesive could be used if desired.

In accordance with another aspect of the disclosure, the nut 86 can include a reinforced threaded insert, such as a metal insert 98, configured for threaded engagement with the elongate threaded member 84, and a plastic annulus 100 bonded about an outer surface of the metal insert 98. The plastic annulus 100 can be formed to extend radially outwardly from the metal insert 98 to facilitate rotating the nut 86, such as via hand tightening, into threaded engagement with the elongate threaded member 84. To further enhance the ability to hand tighten the nut 86, the annulus 100 can be formed, such as via molding, having a roughened or undulating outer periphery, shown as having a plurality of teeth 102. Accordingly, assembly is simplified, thereby enhancing the economies of assembly. Additionally, to further enhance assembly, molded retention features 104 (FIG. 6A) can be provided to extend radially inwardly from the annulus 92 for close, and even slight interference, if desired, fit with an outer surface of the male threaded member 84, thereby preventing the male threaded member 84 from falling out during assembly.

In accordance with a further aspect of the disclosure, the lifter plates 44 can be preassembled to the window 38 as a subassembly, whereupon final assembly is made easy by only having to adjust the window 46, as desired, and then tighten the fastener assembly 82 via hand tightening the nut 86.

While the above description constitutes a plurality of embodiments of the present invention, it will be appreciated that the present invention is susceptible to further modification and change without departing from the fair meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lifter plate assembly for a window of a motor vehicle, comprising:
a main body formed of a plastic material, said main body having at least one rail guide hook formed therein configured for sliding receipt of window regulator rails therein, a window clamp plate formed as a monolithic piece of the plastic material of the main body and extending in spaced relation from the main body to provide a receptacle between the main body and the window clamp plate, with the receptacle being configured for receipt of an edge of the window therein;
a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window;
wherein the main body includes a plurality of ribs bounding a plurality of voids;
wherein at least one of the plurality of ribs forms an annulus about the opening in the main body; and
wherein a plurality of the ribs form spokes extending radially outwardly from the annulus, wherein the annulus has an increased thickness relative to the spokes.

2. The lifter plate assembly of claim 1, wherein the at least one rail guide hook includes a pair of rail guide hooks laterally spaced from one another, wherein at least one of the plurality of ribs extends between the pair of rail guide hooks in attached relation therewith.

3. The lifter plate assembly of claim 1, further including a cable connector body formed of a monolithic piece of the plastic material of the main body, the cable connector body being configured for fixed receipt of drive cables therein.

4. The lifter plate assembly of claim 3, wherein a plurality of ribs extend between the main body and a wall of the cable connector body.

5. A lifter plate assembly for a window of a motor vehicle, comprising:
a main body formed of a plastic material, said main body having at least one rail guide hook formed therein configured for sliding receipt of window regulator rails therein, a window clamp plate formed as a monolithic piece of the plastic material of the main body and extending in spaced relation from the main body to provide a receptacle between the main body and the window clamp plate, with the receptacle being configured for receipt of an edge of the window therein;
a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window; and
wherein the nut includes a metal threaded insert configured for threaded engagement with the elongate threaded member and a plastic annulus bonded to the metal threaded insert, the plastic annulus extending radially outwardly from the metal insert to facilitate rotating the nut in threaded engagement with the elongate threaded member by hand.

6. A lifter plate assembly for a window of a motor vehicle, comprising:
a main body formed of a plastic material, said main body having at least one rail guide hook formed therein configured for sliding receipt of window regulator rails therein, a window clamp plate formed as a monolithic piece of the plastic material of the main body and extending in spaced relation from the main body to provide a receptacle between the main body and the window clamp plate, with the receptacle being configured for receipt of an edge of the window therein;
a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window; and
further including a lubricious insert fixed within the at least one rail guide hook to line an inner surface of the at least one rail guide hook.

7. The lifter plate assembly of claim 6, wherein the lubricious insert is snap fit within the at least one rail guide hook.

8. The lifter plate assembly of claim 6, wherein the lubricious insert is a bushing.

9. The lifter plate assembly of claim 6, wherein the lubricious insert is a bushing grade polymeric material.

10. The lifter plate assembly of claim 6, wherein the lubricious insert is a bushing grade metallic material.

11. A carrier assembly, comprising:
a pair of carrier members, each of said carrier members having a window regulator rail;
a pair of lifter plate assemblies, each of said lifter plate assemblies having a main body formed of a plastic material, said main body having at least one rail guide hook formed therein configured for sliding receipt of a separate one of said window regulator rails, a window clamp plate formed as a monolithic piece of the plastic material of the main body and extending in spaced relation from the main body to provide a receptacle between the main body and the window clamp plate, with the receptacle being configured for receipt of an edge of the window therein;
a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window;
wherein the main body includes a plurality of ribs bounding a plurality of voids and wherein the at least one rail guide hook includes a pair of rail guide hooks laterally spaced from one another, with at least one of the plurality of ribs extending between the pair of rail guide hooks in attached relation therewith;
wherein at least one of the plurality of ribs forms an annulus about the opening in the main body;
wherein a plurality of the ribs form spokes extending radially outwardly from the annulus; and
wherein the annulus has an increased thickness relative to the spokes.

12. The carrier assembly of claim 11, further including a cable connector body formed of a monolithic piece of the plastic material of the main body, the cable connector body being configured for fixed receipt of drive cables therein.

13. The carrier assembly of claim 12, wherein a plurality of ribs extend between the main body and a wall of the cable connector body.

14. The carrier assembly of claim 11, wherein the carrier assembly is installable within a frameless door assembly.

15. A carrier assembly, comprising:
a pair of carrier members, each of said carrier members having a window regulator rail;
a pair of lifter plate assemblies, each of said lifter plate assemblies having a main body formed of a plastic material, said main body having at least one rail guide hook formed therein configured for sliding receipt of a separate one of said window regulator rails, a window clamp plate formed as a monolithic piece of the plastic material of the main body and extending in spaced relation from the main body to provide a receptacle between the main body and the window clamp plate, with the receptacle being configured for receipt of an edge of the window therein;
a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window; and
wherein the nut includes a metal threaded insert configured for threaded engagement with the elongate threaded member and a plastic annulus bonded to the metal threaded insert, the plastic annulus extending radially outwardly from the metal insert to facilitate rotating the nut in threaded engagement with the elongate threaded member by hand.

16. A carrier assembly, comprising:
a pair of carrier members, each of said carrier members having a window regulator rail;
a pair of lifter plate assemblies, each of said lifter plate assemblies having a main body formed of a plastic material, said main body having at least one rail guide hook formed therein configured for sliding receipt of a separate one of said window regulator rails, a window clamp plate formed as a monolithic piece of the plastic material of the main body and extending in spaced relation from the main body to provide a receptacle between the main body and the window clamp plate, with the receptacle being configured for receipt of an edge of the window therein;
a fastener assembly including an elongate threaded member extending through an opening in the main body and through an opening in the window clamp plate and a nut, wherein at least one of the elongate threaded member and the nut is rotatable relative to the other of the elongate threaded member and the nut to draw the window clamp plate and the main body toward one another to clamp against the edge of the window; and
further including a lubricious insert fixed within the at least one rail guide hook to line an inner surface of the at least one rail guide hook.

* * * * *